(12) United States Patent
Shimizu et al.

(10) Patent No.: US 7,985,312 B2
(45) Date of Patent: Jul. 26, 2011

(54) ULTRASONIC WELDING APPARATUS AND METHOD FOR PRODUCING WELDED PRODUCT

(75) Inventors: Yoichiro Shimizu, Kasugai (JP); Akihiko Taniguchi, Kakamigahara (JP); Koichiro Hara, Nagoya (JP); Hirotake Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 329 days.

(21) Appl. No.: 12/393,770

(22) Filed: Feb. 26, 2009

(65) Prior Publication Data

US 2009/0218032 A1    Sep. 3, 2009

(30) Foreign Application Priority Data

Feb. 28, 2008 (JP) .................................. 2008-047014

(51) Int. Cl.
*B32B 37/00* (2006.01)

(52) U.S. Cl. .................... 156/73.1; 156/275.5; 156/356; 156/359; 156/379.6; 156/580.1

(58) Field of Classification Search .............. 156/64, 156/73.1, 272.2, 275.5, 356, 359, 379.6, 156/580.1, 580.2
See application file for complete search history.

(56) References Cited

U.S. PATENT DOCUMENTS

| 7,331,652 B2 * | 2/2008 | Hattori et al. .................. 347/47 |
| 2004/0239733 A1 | 12/2004 | Hattori et al. |

FOREIGN PATENT DOCUMENTS

| JP | H04-267130 A | 9/1992 |
| JP | H04-371827 A | 12/1992 |
| JP | 3021310 | 2/1996 |
| JP | H09-278022 A | 10/1997 |
| JP | H10-278470 A | 10/1998 |
| JP | 2004-351839 A | 12/2004 |

OTHER PUBLICATIONS

Japan Patent Office; Notice of Reasons for Rejection in Japanese Patent Application No. 2008-047014 (counterpart to the above-captioned US Patent Application) mailed on Jun. 22, 2010.

* cited by examiner

*Primary Examiner* — James Sells
(74) *Attorney, Agent, or Firm* — Baker Botts L.L.P.

(57) ABSTRACT

In an ultrasonic welding apparatus, ultraviolet-curable ink droplets are discharged to an upper surface of stacked sheets by means of an ink-jet head to land the ink droplets in a predetermined area on the upper surface of the sheets. The sheets, on which the ink droplets have been landed, are interposed and pressed between a welding horn and a receiving stand, while the welding horn is ultrasonically vibrated. Accordingly, the stacked sheets are welded to one another at portions opposed to the predetermined area in which the ink droplets are landed. In this way, the ultrasonic welding apparatus is provided, which makes it possible to perform the ultrasonic welding irrelevant to the shape of the area to be subjected to the welding.

18 Claims, 12 Drawing Sheets

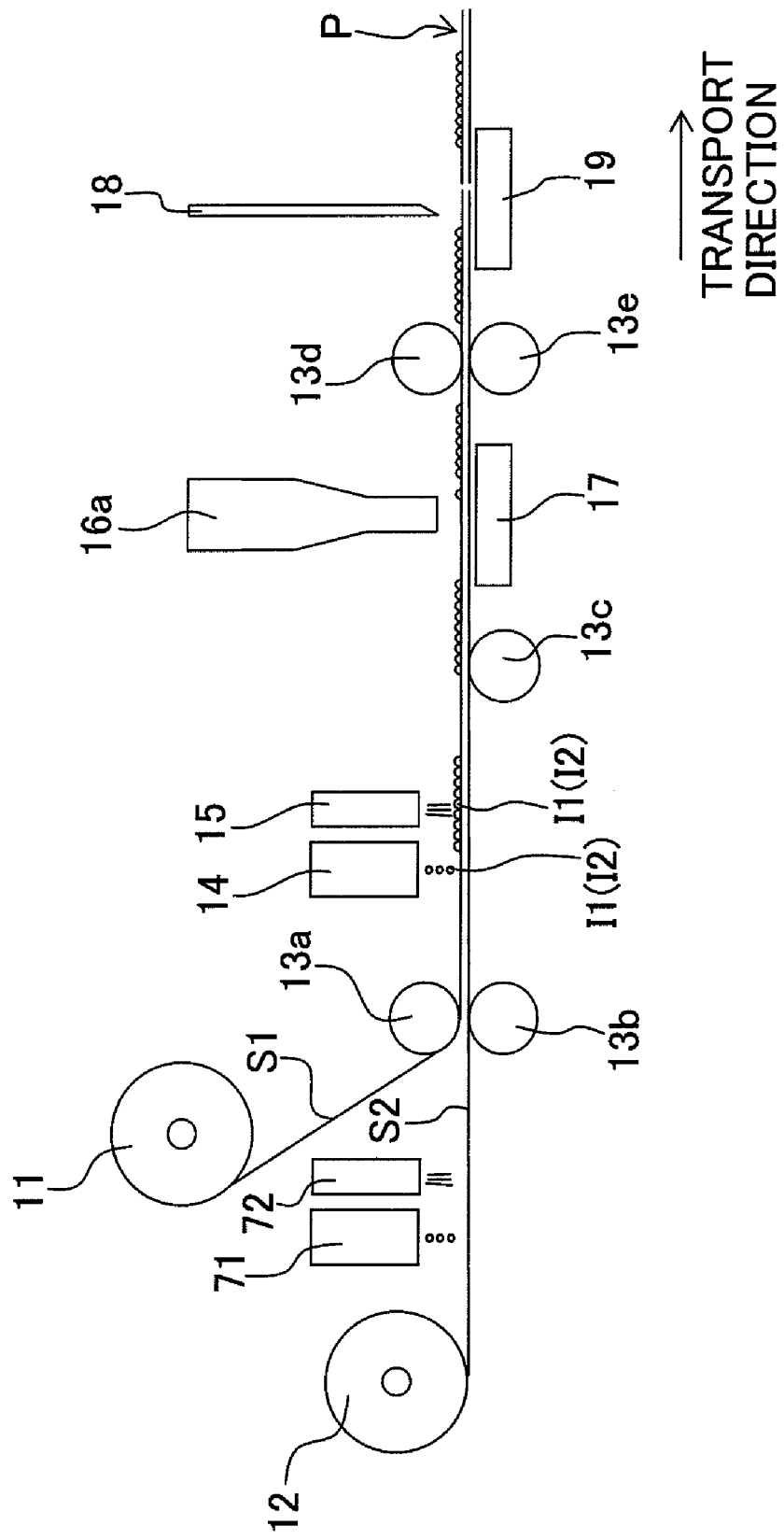

ULTRASONIC WELDING APPARATUS AND METHOD FOR PRODUCING WELDED PRODUCT

CROSS REFERENCE TO RELATED APPLICATION

The present application claims priority from Japanese Patent Application No. 2008-047014, filed on Feb. 28, 2008 the disclosures of which are incorporated herein by reference in its entirety.

BACKGROUND OF THE INVENTION

1. Field of the Invention

The present invention relates to an ultrasonic welding apparatus for welding a welding workpiece by applying the ultrasonic wave, and a method for producing a welded product in which a plurality of welding workpieces are welded to one another.

2. Description of the Related Art

An apparatus for producing a two-way opening filing case is disclosed in Japanese Patent Application Laid-open No. 10-278470. An OPP film (oriented polypropylene), which is wound around a film roll, is doubly folded in the widthwise direction. The OPP film is interposed between a receiver and a welding horn (an ultrasonic horn) which extends over the entire width of the folded OPP film. In the apparatus for producing the two-way opening filing case, the folded OPP film can be ultrasonically welded at the welding portion which extends along a straight line over the entire width thereof.

However, the apparatus for producing the two-way opening filing case described in Japanese Patent Application Laid-open No. 10-278470 has the welding portion which extends along the straight line in the widthwise direction of the OPP film as described above. Therefore, it is impossible to weld any OPP film in any area having a shape different from that of the welding portion. In order to perform the welding of such a type, it is necessary to exchange the welding horn with any distinct one. That is, it is necessary to prepare exclusive welding horns depending on the shapes of areas to be subjected to the welding.

SUMMARY OF THE INVENTION

An object of the present invention is to provide an ultrasonic welding apparatus which makes it possible to perform the ultrasonic welding irrelevant to the shape of the area to be subjected to the welding, and a method for producing a welded product which makes it possible to perform the ultrasonic welding irrelevant to the shape of the area to be subjected to the welding.

According to a first aspect of the present invention, there is provided an ultrasonic welding apparatus which welds a first member and a second member of a welding-objective member, the first and second members being stacked to be brought into contact with each other, the ultrasonic welding apparatus comprising:

a first liquid droplet discharge head which discharges a curable liquid droplet toward a surface of the welding-objective member; and an ultrasonic vibration-applying mechanism which includes a contact member which is brought into contact with the liquid droplets cured on the surface of the welding-objective member and a vibrator which vibrates the contact member and which applies an ultrasonic vibration to the welding-objective member via the cured liquid droplets.

According to the first aspect of the present invention, when the liquid droplets are discharged to the surface of the welding-objective member or welding workpiece by means of the first liquid droplet discharge head, and the discharged liquid droplets are cured on the surface of the welding-objective member, then the bumps or bulges are formed by the cured liquid droplets on the surface of the welding-objective member. Therefore, when the contact member is pressed against the surface of the welding-objective member, it is possible to provide such a state that the contact member is allowed to abut against the cured liquid droplets converted into the bumps on the surface of the welding-objective member, and the contact member is separated from the welding-objective member. When the contact member is ultrasonically vibrated in this state, then the ultrasonic vibration is applied to only the portions of the welding-objective member opposed to the cured liquid droplets, and the first and second members are welded to one another only at the portions to which the ultrasonic vibration is applied. Accordingly, when the positions, to which the liquid droplets are discharged, are changed, the first and second members can be welded to one another at the desired positions by using the same contact member. The versatility of the ultrasonic welding apparatus is enhanced. It is not necessarily indispensable that at least the member, which is included in the first and second members and which is stacked on the side opposite to the contact member, is the sheet-shaped member. Even in such a case, on condition that the member, which is stacked on the side near to the contact member, is sufficiently thin, the ultrasonic vibration is applied to only the portions of the interface between the first and second members overlapped with the cured liquid droplets, when the contact member is pressed to make the abutment by the aid of the cured liquid droplets. The first and second members are welded to one another.

In the ultrasonic welding apparatus of the present invention, both of the first and second members may be sheet members. In this arrangement, when the contact member is pressed to make the abutment by the aid of the cured liquid droplets, then the ultrasonic vibration is reliably applied to only the portions of the interface of the both sheet members overlapped with the cured liquid droplets, and the both sheet members are welded to one another.

The ultrasonic welding apparatus of the present invention may further include a stacking mechanism which bundles and stacks the sheet members to be brought into contact with each other to form the welding-objective member In this arrangement, it is possible to prepare the welding-objective member in which the plurality of sheets are stacked in the mutually contacting state in the ultrasonic welding apparatus.

The ultrasonic welding apparatus of the present invention may further include a transport mechanism which includes a pair of transport rollers which interpose the welding-objective member therebetween and which transport the interposed welding-objective member to a droplet-landing position at which the liquid droplets discharged from the first liquid droplet discharge head are capable of being landed, wherein the transport rollers may serve also as the stacking mechanism.

In this arrangement, when the pair of transport rollers for transporting the welding-objective member while interposing the welding-objective member in the thickness direction is provided, the pair of transport rollers are used as the stacking mechanism as well. Accordingly, it is possible to simplify the structure of the apparatus.

The ultrasonic welding apparatus of the present invention may further include a second liquid droplet discharge head which discharges a curable liquid droplet onto a surface, of one of the sheet members, which is to be welded to the other sheet member, among the sheet members of the welding-objective member. In this arrangement, the portions of the sheet member, which are overlapped with the liquid droplets discharged by the second liquid droplet discharge head, are not welded. Therefore, the portions, in which the welding force is small and which are easily exfoliated, can be formed for the welding-objective member.

In the ultrasonic welding apparatus of the present invention, the welding-objective member may further include a surface-forming sheet which is formed of a material different from materials forming the sheet members and which is stacked on the stacked sheet members such that a surface layer of the surface-forming sheet is the surface of the welding-objective member; and the first liquid droplet may discharge head discharges the liquid droplets onto the surface-forming sheet.

The surface-forming sheet is composed of the material different from that of the sheet member. Therefore, the joining force between the surface-forming sheet and the sheet member is smaller than the joining force between the sheet members. Therefore, the surface-forming sheet, which is formed with the bumps, can be easily exfoliated and removed after welding the sheet members to one another.

In the ultrasonic welding apparatus of the present invention, the material for forming the surface-forming sheet may have a melting point which is higher than those of the materials for forming the sheet members. In this arrangement, when the surface-forming sheet is the high melting point sheet having the melting point higher than that of the sheet member, the high melting point sheet is not melt when the ultrasonic vibration is applied. The high melting point sheet and the another sheet member are not welded to one another. Alternatively, the high melting point sheet and the another sheet member are welded to one another by a welding force smaller than the welding force between the sheet members. Therefore, the high melting point sheet, on which the bumps are formed, can be easily exfoliated and removed after welding the sheet members to one another.

The ultrasonic welding apparatus of the present invention may further include an exfoliating mechanism which exfoliates the surface-forming sheet from the welding-objective member including the sheet members having been welded by the ultrasonic vibration applied to the welding-objective member by the ultrasonic vibration-applying mechanism. When the surface-forming sheet is unnecessary after the sheet members are welded to one another, it is possible to perform both of the welding of the sheet members and the exfoliation of the surface-forming sheet in the ultrasonic welding apparatus.

In the ultrasonic welding apparatus of the present invention, the welding-objective member may further include a soluble surface layer which is soluble in a predetermined solvent and which is stacked on the sheet members such that a surface layer of the soluble surface layer is the surface of the welding-objective member. In this arrangement, the surface soluble layer, on which the bumps are formed, can be removed by treating the welding-objective member with the predetermined solvent after welding the sheet members to one another.

The ultrasonic welding apparatus of the present invention may further include a soluble layer-removing mechanism which removes the soluble surface layer by treating the welding-objective member, in which the sheet members and the soluble surface layer are welded to one another, with the predetermined solvent, while allowing the sheet members to remain. In this arrangement, it is possible to perform both of the welding of the sheet members and the removal of the surface soluble layer in the ultrasonic welding apparatus.

The ultrasonic welding apparatus of the present invention may further include a controller which controls the first liquid droplet discharge head and the ultrasonic vibration-applying mechanism. In this arrangement, it is possible to automatically weld the welding-objective members to one another in the ultrasonic welding apparatus.

In the ultrasonic welding apparatus of the present invention, the controller may control the first liquid droplet discharge head based on welding strength information about a welding strength of the sheet members such that spacing distances between the liquid droplets landed on the surface of the welding-objective member are greater as a welding with a weaker strength is designated by the welding strength information.

In this arrangement, the smaller the spacing distances between the liquid droplets are, the larger the welding force between the sheet members is. The larger the spacing distances between the liquid droplets are, the smaller the welding force between the sheet members is. Therefore, when the spacing distances between the liquid droplets discharged onto the welding-objective member are changed depending on the welding strength information, the sheet members can be welded to one another by the desired welding force.

In the ultrasonic welding apparatus of the present invention, the controller may control the first liquid droplet discharge head based on welding position data for designating a position at which the sheet members are to be welded on the surface of the welding-objective member, and image data for forming an image without welding the sheet members on the surface such that when the liquid droplets are discharged from the first liquid droplet discharge head in accordance with the image data, at least one of a volume and a number of the liquid droplets to be discharged is determined so that height of the liquid droplets, cured on the surface of the welding-objective member, are lower than height of the liquid droplets when the liquid droplets are discharged from the first liquid droplet discharge head in accordance with the welding position data.

In this arrangement, the liquid droplets, which are cured at the positions designated by the image data, have the height lower than the height of the liquid droplets which are cured at the positions designated by the welding position data. When the contact member is pressed against the welding-objective member on which the two type of liquid droplets have been landed, then the contact member abuts against only the liquid droplets which have the higher height and which are cured at the positions designated by the welding position data, and the contact member does not abut against the liquid droplets which have the lower height and which are cured at the positions designated by the image data. Therefore, the sheet members are welded to one another only at the positions designated by the welding position data. Accordingly, it is possible to simultaneously perform the discharge of the liquid droplets to the positions at which the welding is performed and the discharge of the liquid droplets to be performed in order to form the image.

In the ultrasonic welding apparatus of the present invention, the first liquid droplet discharge head may discharge photocurable liquid droplets; and the ultrasonic welding apparatus may further include a light-radiating mechanism which radiates a light onto the photocurable liquid droplets discharged from the first liquid droplet discharge head and adhered to the surface of the welding-objective member. Accordingly, the liquid droplets, which are adhered to the welding-objective member, can be cured with ease by discharging the photocurable liquid droplets from the liquid droplet discharge head and radiating the light onto the liquid droplets adhered to the welding-objective member.

According to a second aspect of the present invention, there is provided a method for producing a welded product in which first and second members are welded to each other, the method including:

providing a welding workpiece including the first and second members stacked to be brought into contact with each other;

discharging curable liquid droplets toward a surface of the welding workpiece; and welding the first and second members by bringing a contact member into contact with the liquid droplets cured on the surface of the welding workpiece and vibrating the contact member to apply ultrasonic vibration to the welding workpiece via the cured liquid droplets.

According to the second aspect of the present invention, the contact member is allowed to abut against the liquid droplets cured on the surface of the welding workpiece or welding-objective member to vibrate the contact member, and thus the first and second members, which are included in the welding workpiece and which are exemplified by the sheet members, can be welded at only the positions at which the liquid droplets are adhered. Therefore, when the positions, to which the liquid droplets are discharged, are changed, the first and second members can be welded to one another at the desired positions by using the same contact member. It is not necessarily indispensable that at least the member, which is included in the first and second members and which is stacked on the side opposite to the contact member, is the sheet-shaped member. Even in such a case, on condition that the member, which is stacked on the side near to the contact member, is sufficiently thin, the ultrasonic vibration is applied to only the portions of the interface between the first and second members overlapped with the cured liquid droplets, when the contact member is pressed to make the abutment by the aid of the cured liquid droplets. The first and second members are welded to one another.

In the method for producing the welded product of the present invention, both of the first and second members may be sheet members. Further, a surface-forming sheet, which is formed of a material different from those forming the sheet members, may be stacked so that the surface-forming sheet is an uppermost layer of the welding workpiece when the welding workpiece is provided; and the curable liquid droplets may be discharged onto a surface of the surface-forming sheet as the surface of the welding workpiece. Further, the material for forming the surface-forming sheet may have a melting point which is higher than those of the materials forming the sheet members.

According to the ultrasonic welding apparatus of the present invention, when the liquid droplets are discharged to the surface of the welding-objective member by the first liquid droplet discharge head, and the discharged liquid droplets are cured on the surface of the welding-objective member, then the bumps are formed by the cured liquid droplets on the surface of the welding-objective member. Therefore, the contact member can be allowed to approach the surface of the welding-objective member so that the contact member is allowed to abut against the cured liquid droplets converted into the bumps on the surface of the welding-objective member, and the contact member is separated from the welding-objective member. When the contact member is ultrasonically vibrated in this state, the ultrasonic vibration is applied to only the portions of the welding-objective member opposed to the cured liquid droplets. Therefore, the plurality of welding-objective members are welded to one another at only the portions to which the ultrasonic vibration is applied. Accordingly, when the positions, to which the liquid droplets are discharged, are changed, the plurality of welding-objective members can be welded to one another at the desired positions by using the same contact member. The versatility of the ultrasonic welding apparatus is enhanced.

According to the method for producing the welded product of the present invention, when the contact member is allowed to abut against the liquid droplets cured on the surface of the welding workpiece, and the contact member is vibrated, then the ultrasonic vibration is applied to only the portions of the welding workpiece opposed to the cured liquid droplets. The welding workpieces are welded to one another only at the portions to which the ultrasonic vibration is applied. Therefore, when the positions, to which the liquid droplets are discharged, are changed, the plurality of welding workpieces can be welded to one another at the desired positions by using the same contact member.

BRIEF DESCRIPTION OF THE DRAWINGS

FIG. 11 shows a fourth modified embodiment corresponding to FIG. 2.

DESCRIPTION OF THE PREFERRED EMBODIMENTS

A preferred embodiment of the present invention will be explained below.

Figure 1:
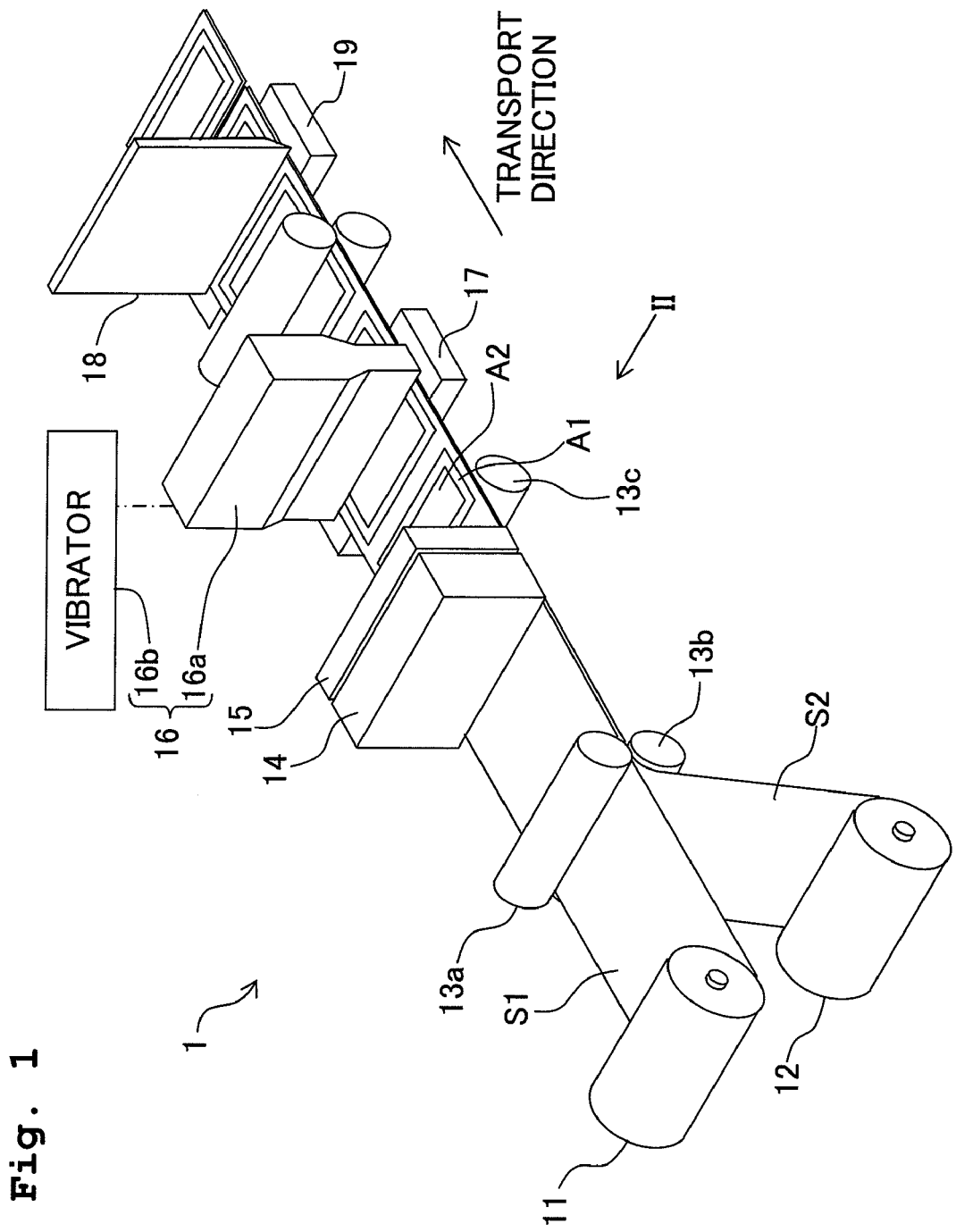
FIG. 1 shows a schematic arrangement illustrating an ultrasonic welding apparatus according to an embodiment of the present invention.
Figure 2:
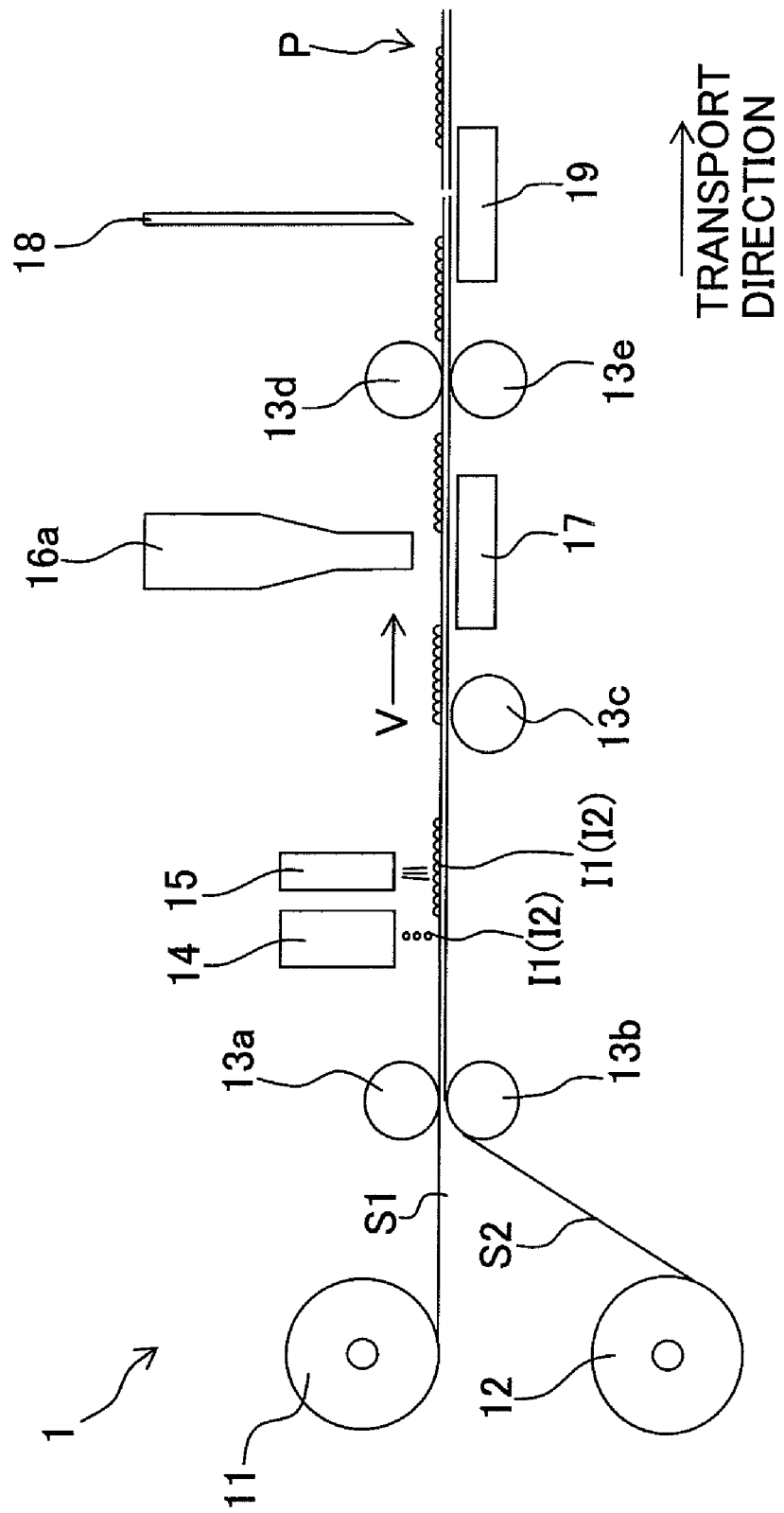
FIG. 2 shows a side view illustrating those shown in FIG. 1 as viewed in a direction of an arrow II.

FIG. 1 shows a schematic arrangement illustrating an ultrasonic welding apparatus according to the embodiment of the present invention. FIG. 2 shows a side view illustrating those shown in FIG. 1 as viewed in a direction of an arrow II. As shown in FIGS. 1 and 2, the ultrasonic welding apparatus 1 includes, for example, two roll-installing sections 11, 12, transport rollers 13a to 13e, an ink-jet head 14, an ultraviolet radiating apparatus 15, an ultrasonic vibration-applying apparatus (ultrasonic vibrator) 16, a receiving stand 17, a cutter 18, and a support stand 19. The operation of the ultrasonic welding apparatus 1 is controlled by a control unit 30 (see FIG. 6) as described later on.

Rolls of sheets S1, S2 (welding sheets, sheet members), each of which is composed of, for example, polypropylene resin (PP resin), are installed to the roll-installing sections 11, 12 respectively. The sheets S1, S2 are drawn from the rolls.

The pair of transport rollers 13*a*, 13*b* are arranged opposingly to one another. The sheets S1, S2, which are drawn from the rolls installed to the roll-installing sections 11, 12, are transported in the rightward direction as shown in FIG. 2 (in the transport direction) while interposing the sheets S1, S2 therebetween. Accordingly, the sheet S1 and the sheet S2 are bundled and stacked in a mutually contacting state. Further, the mutually stacked sheets S1, S2 are transported to the position (landing position at which the liquid droplets can be landed) to which the liquid droplets are discharged by the ink-jet head 14 as described later on. That is, in the embodiment of the present invention, the transport rollers 13*a*, 13*b* serve as both of the transport apparatus for transporting the sheets S1, S2 and the stacking mechanism for stacking the sheet S1 and the sheet S2 in the mutually contacting state to prepare the stack (welding workpiece) of the sheet S1 and the sheet S2.

The transport roller 13*c* is arranged, along the transport direction, between the ultraviolet radiating apparatus 15 and a welding horn (an ultrasonic horn) 16*a* of the ultrasonic vibration-applying apparatus 16 as described later on. The transport rollers 13*d*, 13*e* are arranged on the downstream side of the welding horn 16*a*. The transport rollers 13*c*, 13*d*, 13*e* transport the sheets S1, S2 in the transport direction together with the transport rollers 13*a*, 13*b*. In this embodiment, the combination of the transport rollers 13*a* to 13*e* amounts to the transport apparatus according to the present invention.

Figure 3:
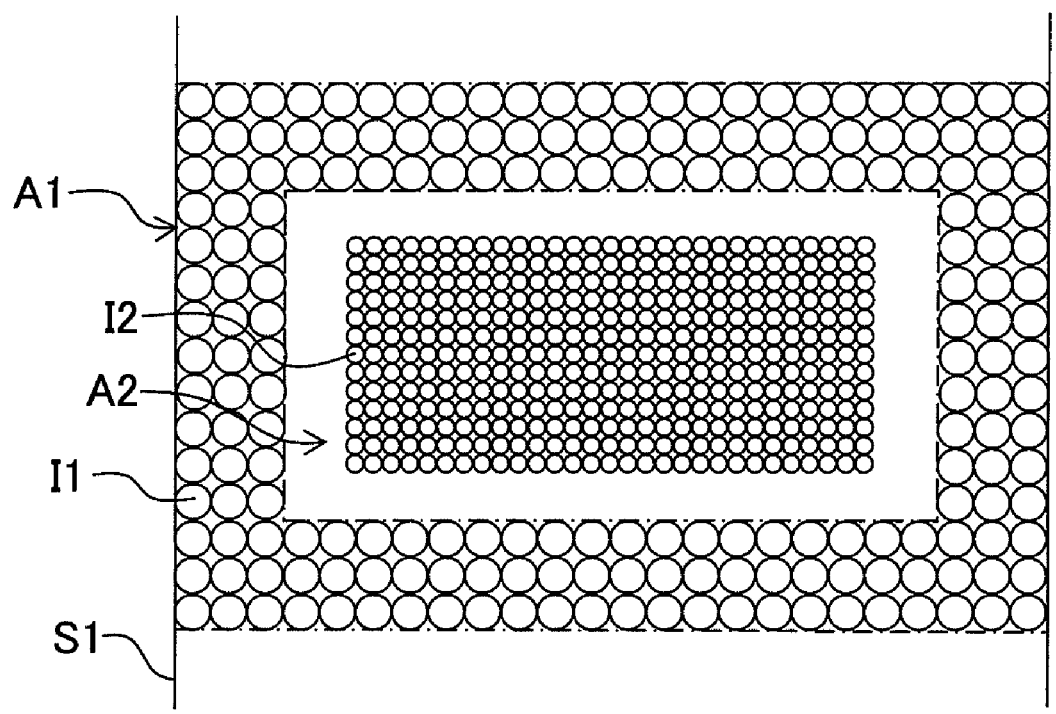
FIG. 3 shows a plan view illustrating a sheet on which ink droplets are landed.

The ink-jet head 14 is arranged on the downstream side of the transport rollers 13*a*, 13*b* in the transport direction so that the ink-jet head 14 is opposed to the sheets S1, S2 to be transported. The ink-jet head 14 discharges droplets of an ultraviolet-curable ink I1 (photocurable liquid droplets, curable liquid droplets) from unillustrated nozzles arranged on the lower surface of the ink-jet head 14 toward the area (welding area A1) facing the portions, on the upper surface of the sheet S1 (surface of the welding workpiece), at which the sheet S1 and the sheet S2 are to be welded. Accordingly, the ink droplets I1 are landed on the welding area A1. In this situation, FIG. 3 shows a plan view illustrating a state of the upper surface of the sheet S1 on which the liquid droplets are landed.

The ink-jet head 14 (first liquid droplet discharge head) discharges ink droplets I2 having a volume smaller than that of the ink droplets I1 (having a lower height when the ink droplets I2 are landed and cured), from nozzles to the area (printing area A2) in which the printing (formation of an image) is to be performed, the printing area A2 being surrounded by the welding area A1 on the upper surface of the sheet S1. As shown in FIG. 3, the ink droplets I2 are landed on the printing area A2. Accordingly, the printing is performed on the printing area A2 by the ink droplets I2.

The ultraviolet radiating apparatus 15 (light-radiating mechanism) is arranged adjacently on the downstream side of the ink-jet head 14 in the transport direction. The ultraviolet radiating apparatus 15 (light-radiating mechanism) is opposed to the sheets S1, S2 to be transported. The ultraviolet radiating apparatus 15 radiates the ultraviolet light toward the upper surface of the sheet S1. Accordingly, the ink droplets I1, I2, which are discharged from the ink-jet head 14 and which are landed on the sheet S1, are cured. Bumps are formed by the cured ink droplets I1, I2.

Figure 4:
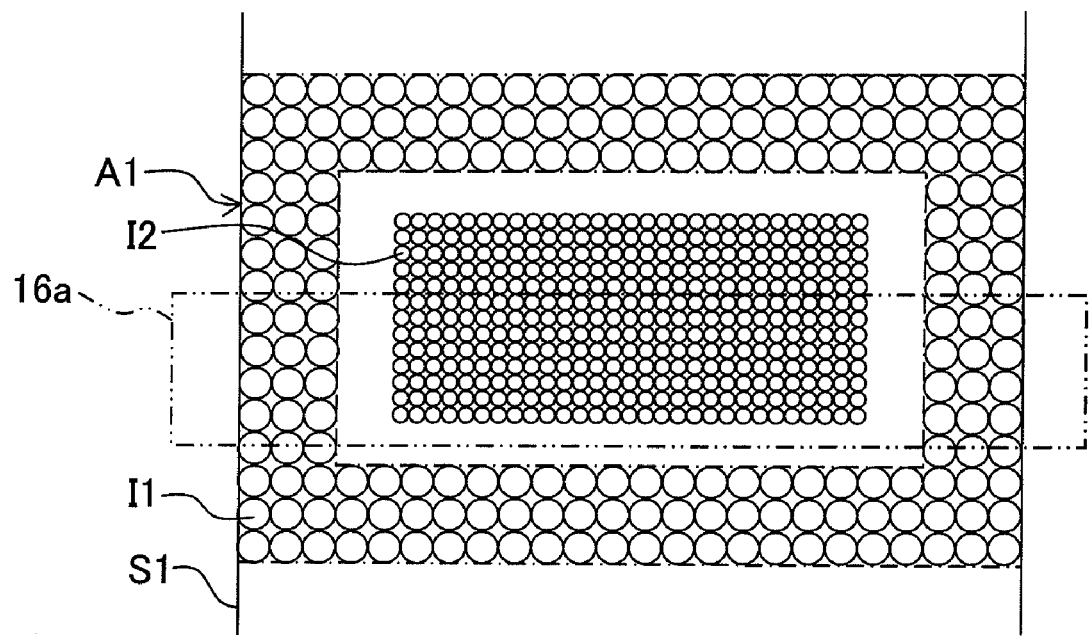
FIG. 4 shows a plan view illustrating a positional relationship between the sheet and a welding horn.
Figure 5:
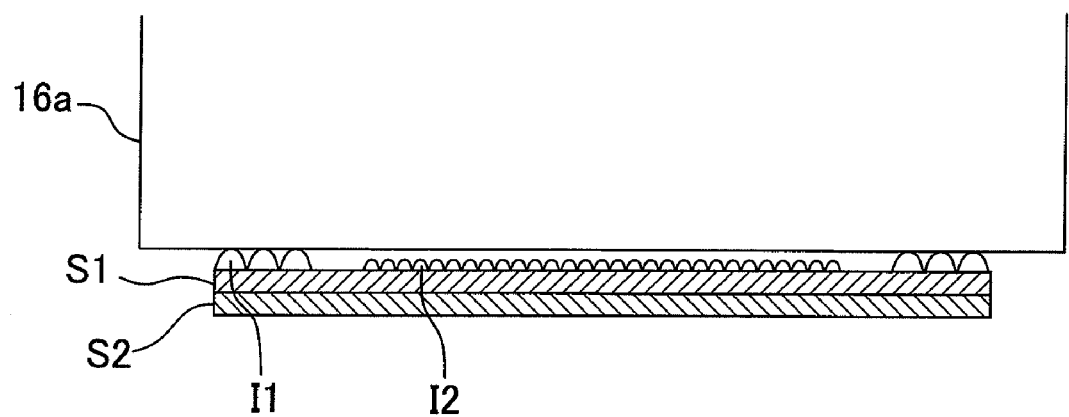
FIG. 5 shows a side view illustrating those shown in FIG. 2 as viewed in a direction of an arrow V.

The ultrasonic vibration-applying apparatus 16 comprises the welding horn 16*a* (contact member, contactor), and a vibration generator (vibrator) 16*b* which ultrasonically vibrates the welding horn 16*a*. FIG. 4 shows a plan view illustrating portions of the sheets S1, S2 shown in FIG. 2 disposed in the vicinity of portions opposed to the welding horn 16*a*. FIG. 5 shows a side view illustrating those shown in FIG. 2 as viewed in a direction of an arrow V. In FIG. 4, the lower surface of the welding horn 16*a* of the ultrasonic vibration-applying apparatus 16 is depicted by alternate long and two short dashes lines as described later on.

The welding horn 16*a* is arranged on the downstream side of the ultraviolet radiating apparatus 15 in the transport direction. The welding horn 16*a* is movable in the upward-downward direction as viewed in FIG. 2. The lower surface of the welding horn 16*a* has a substantially oblong shape with a length longer than those of the sheets S1, S2 on the both sides in the widthwise direction (left-right direction as viewed in FIG. 4) of the sheets S1, S2. When the welding horn 16*a* is moved downwardly, the lower surface thereof abuts against the ink droplets I1 landed on the upper surface of the sheet S1. In this situation, the lower surface of the welding horn 16*a* does not abut against the upper surface of the sheet S1 and the ink droplets I2 having the height lower than that of the ink droplets I1. That is, when the welding horn 16*a* is pressed against the upper surface of the sheet S1, it is possible to provide such a state that the welding horn 16*a* is allowed to abut against the cured ink droplets I1 converted into the bumps on the upper surface of the sheet S1, and the welding horn 16*a* is separated from the sheet S1.

The receiving stand 17 is arranged to be opposed to the lower surface of the welding horn 16*a* while interposing the sheets S1, S2 to be transported. Accordingly, when the welding horn 16*a* is moved downwardly to abut against the ink droplets I1, the sheets S1, S2 are pressed by being interposed between the welding horn 16*a* and the receiving stand 17 at the portions opposed to the ink droplets I1 on the upper surface of the sheet S1. When the welding horn 16*a* is ultrasonically vibrated by the vibrator 16*b* in this state, the ultrasonic vibration is applied to the portions of the sheets S1, S2 opposed to the ink droplets I1 cured on the upper surface of the sheet S1. Accordingly, the vibration energy, which is brought about by the ultrasonic vibration, is converted into the thermal energy at the portions of the sheets S1, S2 to which the ultrasonic vibration is applied. The portions of the sheets S1, S2 are melted by the thermal energy while exceeding the melting point. Thus, the sheet 1 and the sheet S2 are welded to one another at the portions. In this situation, the lower surface of the welding horn 16*a* is not allowed to abut against the upper surface of the sheet S1 and the ink droplets I2. Therefore, the areas of the sheets S1, S2, which are excluded from the portions opposed to the ink droplets I1, are not welded.

When the sheet S1 and the sheet S2 are welded as described above, the sheet S1 and the sheet S2 are welded at only the portions opposed to the ink droplets I1 of the sheet S1. Therefore, when the positions are changed for the ink droplets I1 to be landed on the upper surface of the sheet S1 by the ink-jet head 14, the sheet S1 and the sheet S2 can be welded at the desired positions by using the same welding horn 16*a*.

Even when the ink droplets I2, which have the lower height as compared with the ink droplets I1, are landed on the upper surface of the sheet S1, the lower surface of the welding horn 16*a* does not abut against the ink droplets I2. Therefore, when the ink droplets I2 are landed together with the ink droplets I1 on the upper surface of the sheet S1, it is possible to simultaneously perform the discharge of the ink droplets I1 to the welding area A1 in order to weld the sheet S1 and the sheet S2 and the discharge of the ink droplets I2 to the printing area A2 in order to perform the printing on the upper surface of the sheet S1.

The cutter 18 is arranged at the portion disposed on the downstream side of the welding horn 16a in the transport direction. The support stand 19 is arranged to be opposed to the cutter 18 while interposing the sheets S1, S2 to be transported. The cutter 18 is movable in the upward-downward direction. When the cutter 18 is moved in the downward direction, the stack of the sheet S1 and the sheet S2, which is supported by the support stand 19 and for which the printing and the welding have been completed, is cut. The stack of the sheet S1 and the sheet S2, which has been cut, is the welded product P.

Figure 6:
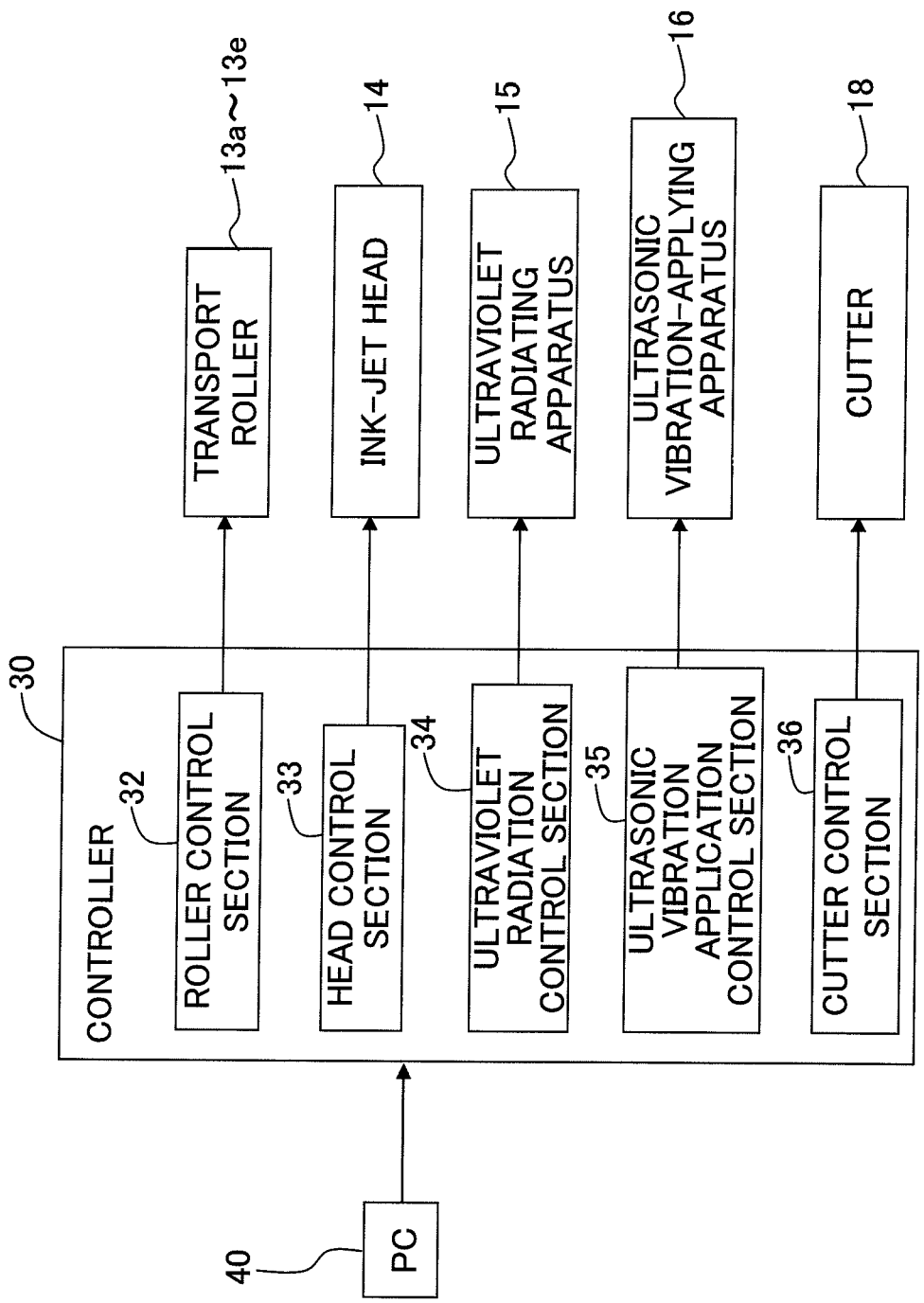
FIG. 6 shows a functional block diagram illustrating a control unit which controls the operation of the ultrasonic welding apparatus shown in FIG. 1.

Next, an explanation will be made about the control unit 30 which controls the operation of the ultrasonic welding apparatus 1. FIG. 6 shows a block diagram illustrating the function of the control unit 30.

The control unit 30 includes, for example, Central Processing Unit (CPU), Read Only Memory (ROM), Random Access Memory (RAM). These components are operated as a roller control section 32, a head control section 33, an ultraviolet radiation control section 34, an ultrasonic vibration application control section 35, and a cutter control section 36 as explained below. The control unit 30 is connected to an external PC 40 which is located outside of the ultrasonic welding apparatus 1. Signals to instruct the welding of the sheet S1 and the sheet S2 and the printing on the sheet S1 are inputted from PC 40 together with welding position data to instruct the position of the welding area A1 (position at which the sheet S1 and the sheet S2 are welded), image data to be printed on the printing area A2, and cutting position data of the sheets S1, S2.

The roller control section 32 controls the operation of the transport rollers 13a to 13e in accordance with the signals to instruct the welding and the printing inputted from PC 40. The head control section 33 controls the timing to discharge the ink droplets in the ink-jet head 14 and the volumes of the ink droplets to be discharged so that the ink droplets I1 are landed on the welding area A1 and the ink droplets I2 are landed on the printing area A2 in response to the signals to instruct the welding and the printing inputted from PC 40 in accordance with the welding position data and the image data inputted together with the signals. That is, the head control section 33 performs the control to determine the volumes of the ink droplets to be discharged so that the height of the liquid droplets is low when the ink droplets are discharged in accordance with the inputted image data as compared with when the ink droplets are discharged in accordance with the inputted welding position data.

The ultraviolet radiation control section 34 control the operation of the ultraviolet radiating apparatus 15 so that the ultraviolet light is radiated onto the upper surface of the sheet S1 on which the ink droplets I1, I2 have been landed, in accordance with the signals to instruct the welding and the printing inputted from PC 40.

The ultrasonic vibration application control section 35 controls the operation of the ultrasonic vibration-applying apparatus 16, in particular the movement of the welding horn 16a in the upward-downward direction and the vibration of the vibrator 16b so that the welding horn 16a is ultrasonically vibrated in the state in which the lower surface of the welding horn 16a abuts against the ink droplets I1 disposed on the upper surface of the sheet S1 in accordance with the signals to instruct the welding and the printing inputted from PC 40.

The cutter control section 36 controls the operation of the cutter 18 so that the sheets S1, S2, for which the welding and the printing have been completed, are cut in response to the signals to instruct the welding and the printing inputted from PC 40 in accordance with the data about the cutting positions of the sheets S1, S2 inputted together with the signals.

Figure 7:
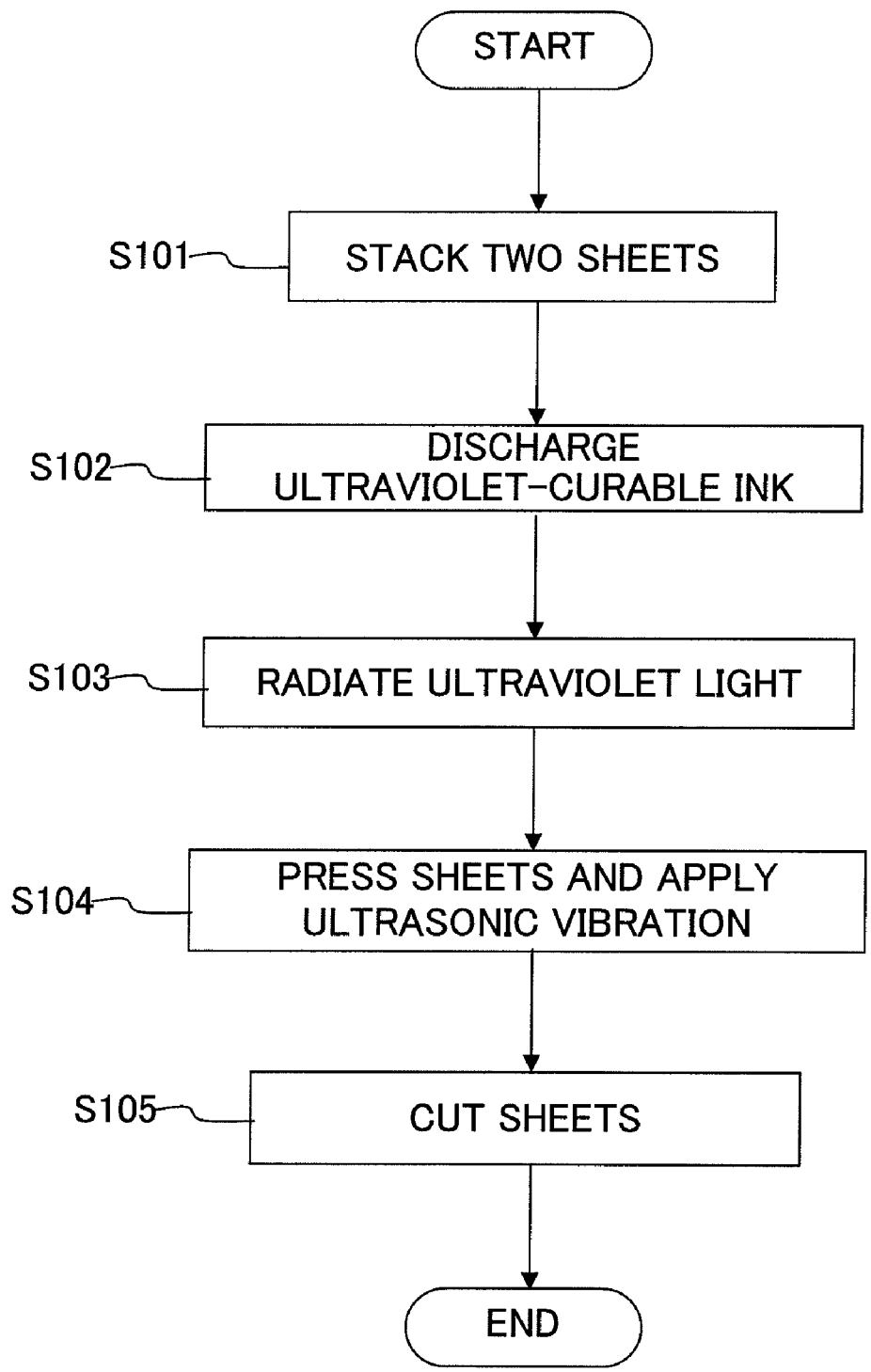
FIG. 7 shows a flow chart illustrating the process for welding the sheets and performing the printing on the sheet by means of the ultrasonic welding apparatus.

Next, an explanation will be made about a procedure to perform the welding between the sheet S1 and the sheet S2 and the printing on the sheet S1 in the welding apparatus 1. FIG. 7 shows a flow chart illustrating this procedure.

In the ultrasonic welding apparatus 1, when the signals to instruct the welding between the sheet S1 and the sheet S2 and the printing on the sheet S1 are inputted from PC 40, as shown in FIG. 7, at first, the sheets S1, S2, which are drawn from the rolls installed to the roll-installing sections 11, 12 respectively, are interposed by the transport rollers 13a, 13b. Accordingly, the sheet S1 and the sheet S2 are stacked in the mutually contacting state, and the sheet S1 and the sheet S2 are transported in the transport direction to the position opposed to the ink-jet head 14 (Step S101, hereinafter simply referred to, for example, as "S101"). The sheets S1, S2 are successively transported in the transport direction by the transport rollers 13a to 13e in accordance with the proceeding of the respective steps as explained below. However, any explanation about the transport of the sheets S1, S2 is omitted below.

Subsequently, the ink droplets I1, I2, which have the mutually different volumes, are discharged from the ink-jet head 14 on the basis of the welding position data and the image data inputted from PC 40. Accordingly, the ink droplets I1 are landed on the welding area A1 of the upper surface of the sheet S1, and the ink droplets I2 are landed on the printing area A2 to perform the printing on the printing area A2 (S102, liquid droplet-discharging step). After that, the ultraviolet light is radiated by the ultraviolet radiating apparatus 15 onto the upper surface of the sheet S1 on which the ink droplets I1, I2 have been landed to cure the landed ink droplets I1, I2 (S103). Accordingly, the bumps, which are used to weld the sheet S1 and the sheet S2, are formed by the ink droplets I1 in the welding area A1, and the printing is performed on the printing area A2 by the ink droplets I2.

Subsequently, the welding horn 16a is moved downwardly, and the lower surface thereof is allowed to abut against the ink droplets I1. Accordingly, the portions of the sheets S1, S2, which are opposed to the ink droplets I1, are pressed by the welding horn 16a and the receiving stand 17. The welding horn 16a is ultrasonically vibrated in this state to apply the ultrasonic vibration to the portions of the sheets S1, S2 opposed to the ink droplets I1 by the aid of the ink droplets I1 (S104, ultrasonic vibration-applying step). Accordingly, the sheet S1 and the sheet S2 are welded at the portions opposed to the welding area A1.

Subsequently, the sheets S1, S2, for which the welding and the printing have been completed, are cut by the cutter 18 in accordance with the inputted cutting position data of the sheets S1, S2 (S105). Accordingly, the welded product P, in which the sheet S1 and the sheet S2 are welded to one another, is completed.

That is, in the ultrasonic welding apparatus 1 of this embodiment, when the signals to instruct the welding between the sheet S1 and the sheet S2 and the printing on the sheet S1 are inputted from the external PC 40 together with the input of, for example, the welding position data, the image data, and the cutting position data of the sheets S1, S2, the steps of S101 to S105 described above are automatically performed by being controlled by the control unit 30.

According to the embodiment as explained above, the ink droplets are discharged from the ink-jet head 14 to land the ink droplets I1 on the welding area A1 of the upper surface of the sheet S1, and the ultraviolet light is radiated onto the landed ink droplets I1 by means of the ultraviolet radiating apparatus 15 to cure the ink droplets I1. Accordingly, the bumps are formed by the ink droplets I1 in the welding area A1. Therefore, when the welding horn 16a is pressed against the sheet S1, then the welding horn 16a is allowed to abut against the ink droplets I1, and the portions of the sheets S1, S2, which are opposed to the ink droplets I1, are interposed and pressed by the welding horn 16a and the receiving stand 17. However, the welding horn 16a is not allowed to abut against the upper surface of the sheet S1 and the ink droplets I2 having the height lower than that of the ink droplets I1. When the welding horn 16a is ultrasonically vibrated in this state, the ultrasonic vibration is applied to only the portions of the sheets S1, S2 opposed to the landed ink droplets I1. The sheet S1 and the sheet S2 are welded at only the portions to which the ultrasonic vibration is applied. Accordingly, when the positions, on which the ink droplets I1 are to be landed, are changed, the sheet S1 and the sheet S2 can be welded at the desired positions by using the same welding horn 16a. The versatility of the ultrasonic welding apparatus 1 is enhanced.

The printing is performed on the printing area A2 by landing the ink droplets I2 on the printing area A2 of the upper surface of the sheet S1 simultaneously with the discharge of the ink droplets I1. However, the ink droplets I2 have the height lower than that of the ink droplets I1. Even when the welding horn 16a is pressed against the sheet S1, the welding horn 16a is not allowed to abut against the ink droplets I2. The sheet S1 and the sheet S2 are not welded in the area on which the ink droplets I2 have been landed.

Therefore, when the ink droplets I1, I2, which have the mutually different heights, are landed on the upper surface of the sheet S1 by means of the ink-jet head 14, it is possible to simultaneously perform the discharge of the ink droplets to the welding area A1 in order to weld the sheet S1 and the sheet S2 and the discharge of the ink droplets in order to perform the printing on the sheet S1.

The sheets S1, S2 are transported in the transport direction while mutually stacking the sheets S1, S2 by means of the transport rollers 13a, 13b. Therefore, it is possible to stack the sheets S1, S2 in the ultrasonic welding apparatus 1. Further, the transport rollers 13a, 13b, which are provided to transport the sheets S1, S2, are also used to stack the sheet S1 and the sheet S2. Therefore, it is unnecessary to distinctly provide any mechanism for stacking the sheet S1 and the sheet S2. The structure of the ultrasonic welding apparatus 1 is simplified.

Next, modified embodiments, in which various modifications are applied to the embodiment of the present invention, will be explained. However, those constructed in the same manner as those of the embodiment of the present invention are designated by the same reference numerals, any explanation of which will be appropriately omitted.

First Modified Embodiment

Figure 8:
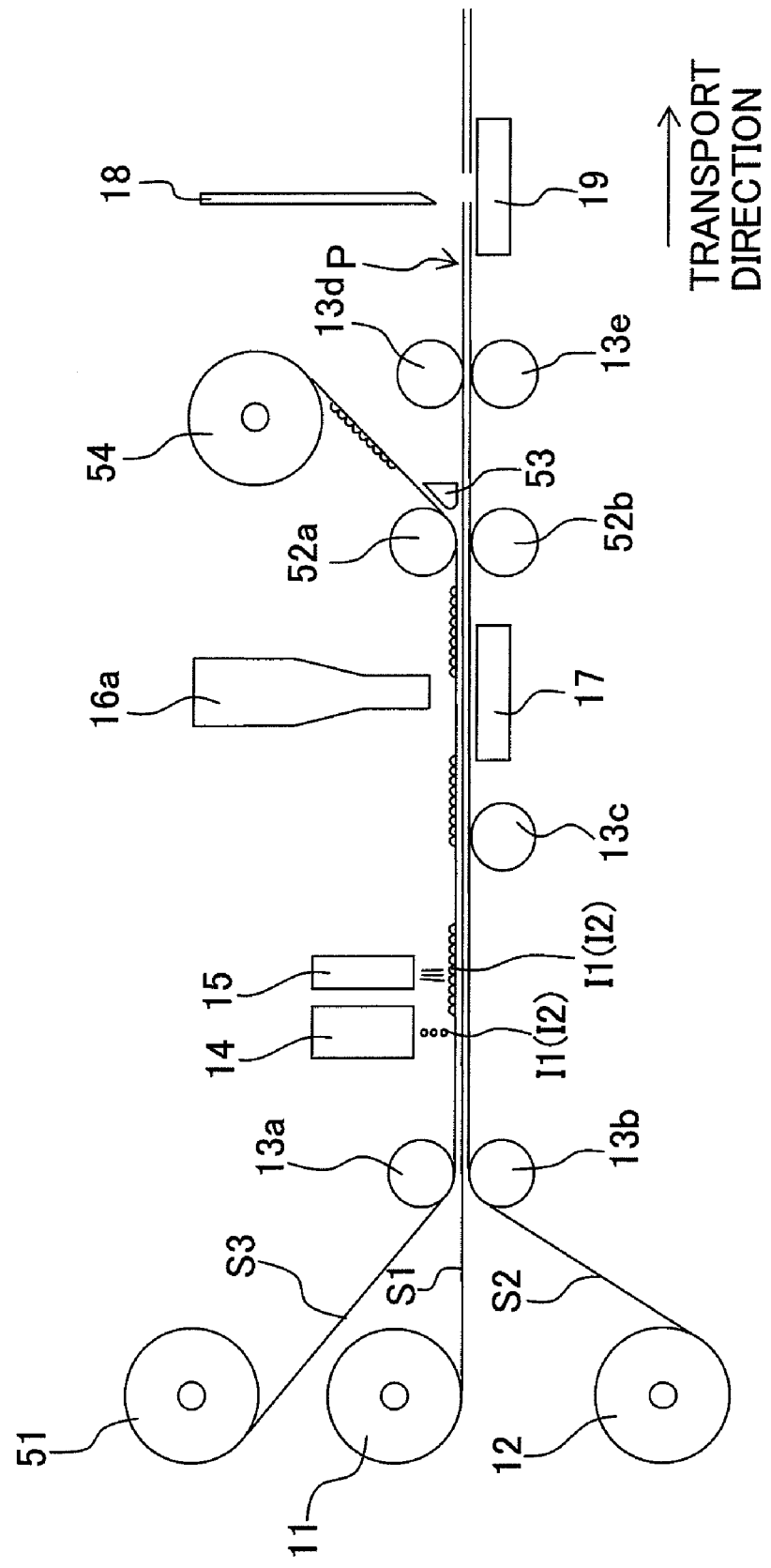
FIG. 8 shows a first modified embodiment corresponding to FIG. 2.

As shown in FIG. 8, an ultrasonic welding apparatus according to a first modified embodiment includes a roll-installing section 51, transport rollers 52a, 52b, an exfoliating member 53, and a sheet-winding section 54 in addition to those constructed in the same manner as in the embodiment of the present invention.

A roll of a sheet S3 (surface-forming sheet, high melting point sheet), which is composed of a material such as polyethylene terephthalate resin (PET resin) having a melting point higher than that of PP resin, is installed to the roll-installing section 51. The sheet S3, which is drawn from the roll, is interposed between the transport rollers 13a, 13b together with the sheets S1, S2, and thus the sheets S1 to S3 are stacked in a mutually contacting state. In this situation, the sheet S3 is stacked on the upper surface of the sheet S1, and the surface layer of the sheet S3 is the surface of the welding workpiece.

The transport rollers 52a, 52b are arranged on the downstream side from the welding horn 16 in the transport direction so that the transport rollers 52a, 52b are opposed to one another while interposing the sheets S1 to S3 to be transported therebetween. The exfoliating member 53 is arranged adjacently on the downstream side of the transport roller 52a in the transport direction. The exfoliating member 53 exfoliates the sheet S3 from the stack of the sheets S1, S2 and the sheet S3 for which the welding has been completed. In this arrangement, the transport rollers 52a, 52b are arranged so that they are opposed to one another while interposing the sheets S1 to S3 as described above. Therefore, the sheet S3, which is exfoliated by the exfoliating member 53, is transported upwardly by the transport roller 52a, and the sheet S3 is wound by the sheet-winding section 54. Further, the sheets S1, S2, to which the ink droplets I1 are not adhered, are transported by the transport roller 52b toward the cutter 18.

In this arrangement, the ink droplets I1 are discharged to the upper surface of the sheet S3 by the ink-jet head 14, and the ultraviolet light is radiated by the ultraviolet radiating apparatus 15 onto the ink droplets I1 landed on the upper surface of the sheet S3. However, in the case of the first modified embodiment, the sheet S3 is exfoliated thereafter. Therefore, unlike the embodiment described above, the ink droplets I2 are not discharged in order to perform the printing on the sheet S3.

In this case, the portions of the sheets S1 to S3, which are opposed to the ink droplets I1 disposed on the upper surface of the sheet S3, are pressed by the welding horn 16a and the receiving stand 17, and the ultrasonic vibration is applied to the portions. In this situation, the sheet S1 and the sheet S2 are welded to one another in the same manner as in the embodiment described above. However, the sheet S3 is composed of the material having the melting point higher than those of the sheets S1, S2. Therefore, even when the ultrasonic vibration is applied, the sheet S3 is not melted. The sheet S3 and the sheet S1 are not welded to one another, or they merely welded with a weak welding force. Therefore, the sheet S3 can be easily exfoliated from the sheets S1 to S3 after the welding by means of the exfoliating member 53. Accordingly, it is possible to weld the sheet S1 and the sheet S2 without allowing the ink droplets I1 to remain on the sheets S1, S2 which are actually welded.

As described above, the melting point of the sheet S3 is higher than those of the sheets S1, S2. However, if the vibration energy, which is applied to the sheets S1 to S3 by means of the ultrasonic vibration, is too large, then the sheet S3 is melted together with the sheets S1, S2, and the welding force between the sheet S3 and the sheet S1 is strengthened. As a result, it is difficult to exfoliate the sheet S3 by means of the exfoliating member 53. Therefore, it is preferable to operate the ultrasonic vibration generator 16b so that the temperatures of the sheets S1 to S3 are not less than the melting points of the sheets S1, S2 and lower than the melting point of the sheet S3 by means of the vibration energy applied to the sheets S1 to S3 by the ultrasonic vibration.

In the first modified embodiment, the sheet S3 is composed of the material having the melting point higher than those of the sheets S1, S2. However, the sheet S3 may have a melting point approximately equal to those of the sheets S1, S2, or the sheet S3 may have a melting point lower than those of the sheets S1, S2, provided that the sheet S3 is composed of the material different from those of the sheets S1, S2. In this case, all of the sheets S1 to S3 are melted, and the sheet S3 and the sheet S1 are welded as well. However, the sheet S3 and the sheet S1, which are composed of the mutually different materials, have the welding force which is smaller than the welding force of the sheet S1 and the sheet S2 which are composed of the same material. Therefore, the sheet S3 can be exfoliated after welding the sheets S1 to S3.

In the first modified embodiment, the exfoliating apparatus 53 and the sheet-winding section 54 are provided, and the sheet S3 is exfoliated from the stack of the sheets S1, S2, S3. However, it is also allowable that the exfoliating apparatus 53 and the sheet-winding section 54 are not provided. In this case, the sheet S3 may be exfoliated at the outside of the ultrasonic welding apparatus after the completion of the welded product P.

Second Modified Embodiment

Figure 9:
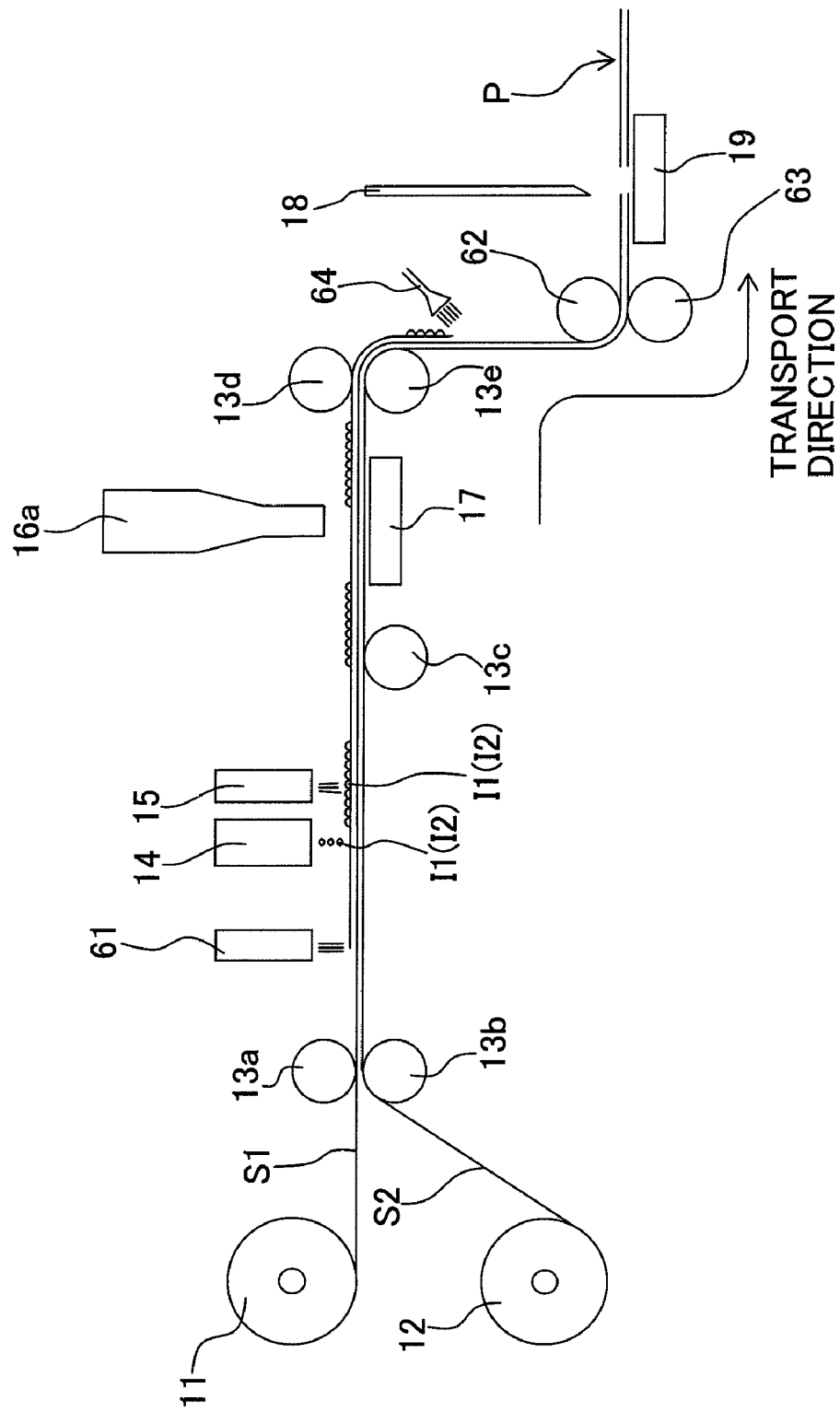
FIG. 9 shows a second modified embodiment corresponding to FIG. 2.

In an ultrasonic welding apparatus according to a second modified embodiment, as shown in FIG. 9, the transport rollers 13d, 13e, the cutter 18, and the support stand 19 are disposed at positions lower than those of the embodiment described above. The apparatus further includes a surface soluble layer-forming apparatus 61, transport rollers 62, 63, and a solvent-applying apparatus 64 in addition to those constructed in the same manner as in the embodiment described above.

The surface soluble layer-forming apparatus 61 is arranged, in the transport direction, between the transport rollers 13a, 13b and the ink-jet head 14. The surface soluble layer-forming apparatus 61 forms a surface soluble layer S5 which can be dissolved, for example, with a predetermined solvent such as water, on the entire region of the upper surface of the sheet S1 stacked with the sheet S2. In the second modified embodiment, the ink droplets I1 are discharged to the upper surface (surface layer) of the surface soluble layer S5 (surface of the welding workpiece) by means of the ink-jet head 14. Also in this case, the surface soluble layer S5 is removed thereafter as described later on. Therefore, the ink droplets I2 are not discharged in order to perform the printing.

The transport rollers 62, 63 are arranged under or below the transport rollers 13d, 13e on the downstream side of the welding horn 16a in relation to the transport direction. Accordingly, the sheets S1, S2, which are transported in the rightward direction as viewed in FIG. 9, are transported while changing the direction to the downward direction as shown in FIG. 9 by means of the transport rollers 13d, 13e. Further, the sheets S1, S2 are transported while changing the direction to the rightward direction as shown in FIG. 9 again by means of the transport rollers 62, 63.

As shown in FIG. 9, the solvent-applying apparatus 64 (soluble layer-removing mechanism) is arranged to face the surface of the sheet S1 at an area disposed on the right side on which the surface soluble layer S5 is formed, the sheet S1 being transported in the upward-downward direction between the transport rollers 62, 63 and the transport rollers 13d, 13e. The solvent-applying apparatus 64 (soluble layer-removing mechanism) applies the solvent which is capable of dissolving the surface soluble layer S5 onto the upper surface of the stack of the sheets S1, S2 on which the surface soluble layer S5 is formed, the welding for the stack being completed. In this embodiment, for example, when the surface soluble layer S5 is water-soluble, water is applied as the solvent.

Accordingly, the surface soluble layer S5 is removed together with the ink droplets I1 landed on the surface thereof, while allowing the sheets S1, S2 to remain. The sheets S1, S2, to which the ink droplets I1 are not adhered, are transported toward the cutter 18. Therefore, the sheet S1 and the sheet S2 can be welded to one another without allowing the ink droplets I1 to remain on the sheets S1, S2. In this case, it is necessary to select the sheet S3 and the solvent so that the sheet S3 is dissolved in the solvent but the sheets S1, S2 are not dissolved in the solvent.

The reason, why the portion, in which the sheets S1, S2 are transported in the upward-downward direction as shown in FIG. 9, is provided and the solvent-applying apparatus 64 is arranged oppositely to this portion in the second modified embodiment, is that it is intended to prevent the applied solvent from being allowed to flow toward the upstream side in the transport direction and prevent the surface soluble layer S5 from being removed from the surface of the sheet S1 before the welding.

The ultrasonic welding apparatus according to the second modified embodiment is provided with the solvent-applying apparatus 64. However, it is not necessarily indispensable to provide the solvent-applying apparatus 64. In this case, the solvent may be applied to the upper surface of the sheet S1 formed with the surface soluble layer S5 to remove the surface soluble layer S5 on which the ink droplets I1, I2 are landed, at the outside of the ultrasonic welding apparatus after the completion of the welded product P.

Third Modified Embodiment

In an ultrasonic welding apparatus according to a third modified embodiment, the operation of the ink-jet head 14 is controlled as follows. The data (welding strength information) to indicate the welding strength between the sheet S1 and the sheet S2 is further inputted into the control unit 30 (see FIG. 6) by the aid of PC 40 (see FIG. 6). In this procedure, the head control section 33 (see FIG. 6) controls the ink-jet head 14 so that the ink droplets I1 are landed at different intervals on the upper surface of the sheet S1 as shown in FIGS. 10A to 10C in accordance with the inputted welding strength.

Figure 10A:
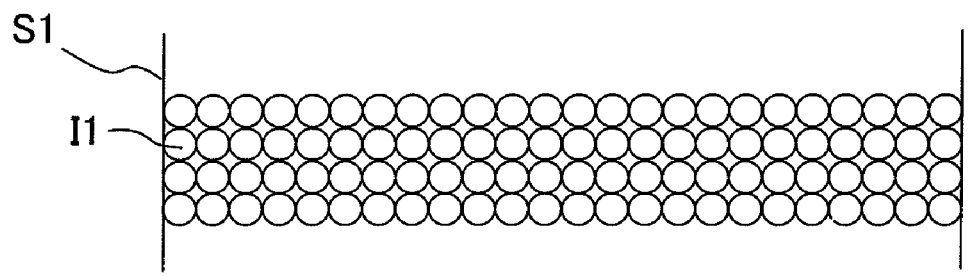
FIGS. 10A, 10B and 10C show plan views illustrating density variations of ink droplets landed on the sheet in a third modified embodiment.
Figure 10B:
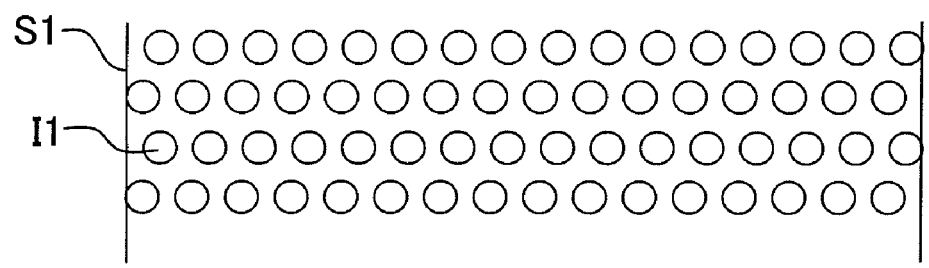
Figure 10C:
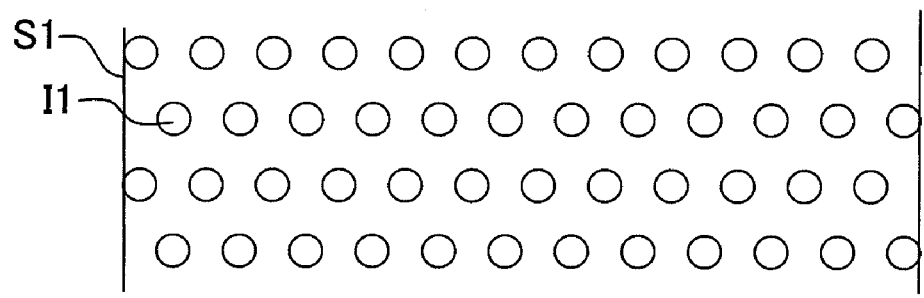

In particular, FIGS. 10A to 10C show situations of the landed ink droplets I1 when the welding strength is set at three levels by way of example. The head control section 32 controls the operation of the ink-jet head 14 on the basis of the welding strength information. For example, the head control section 32 controls the ink-jet head 14 such that the ink droplets I1 are landed while providing substantially no spacing distance as shown in FIG. 10A when the strongest welding strength is designated. Further, the head control section 32 controls the ink-jet head 14 such that the distances of the ink droplets I1 are more widened as shown in FIGS. 10B and 10C as the designated welding strength is weakened.

Accordingly, for example, the portions, at which any exfoliation is unnecessary after the welding is once effected, are welded at the strong welding strength, and the portions, at which the exfoliation is required after the welding, are welded at the weak welding strength. The welding strength between the sheet S1 and the sheet S2 can be allowed to differ for every portion depending on the situation of use of the welded product P of the sheets S1, S2. The welding strength is not limited to the three levels as in the third modified embodiment. The welding strength may be at two levels or four or more levels.

Alternatively, the distances between the ink droplets I1 may be gradually changed so that the welding strength is continuously changed.

Fourth Modified Embodiment

As shown in FIG. 11, an ultrasonic welding apparatus according to a fourth modified embodiment includes an ink-jet head 71 (second liquid droplet discharge mechanism) and an ultraviolet radiating apparatus 72 in addition to those constructed in the same manner as in the embodiment described above. The ink-jet head 71 and the ultraviolet radiating apparatus 72 are the same as or equivalent to the ink-jet head 14 and the ultraviolet radiating apparatus 15 respectively. The ink-jet head 71 and the ultraviolet radiating apparatus 72 are arranged on the upstream side from the transport rollers 13a, 13b in the transport direction. The ink-jet head 71 discharges ultraviolet-curable ink droplets I3 to the upper surface of the sheet S2 (surface to be welded to the sheet S1) before being stacked with the sheet S1 to land the ink droplets I3 on the upper surface of the sheet S2. The ultraviolet radiating apparatus 72 radiates the ultraviolet light onto the upper surface of the sheet S2 to cure the landed ink droplets I3.

Figure 12:
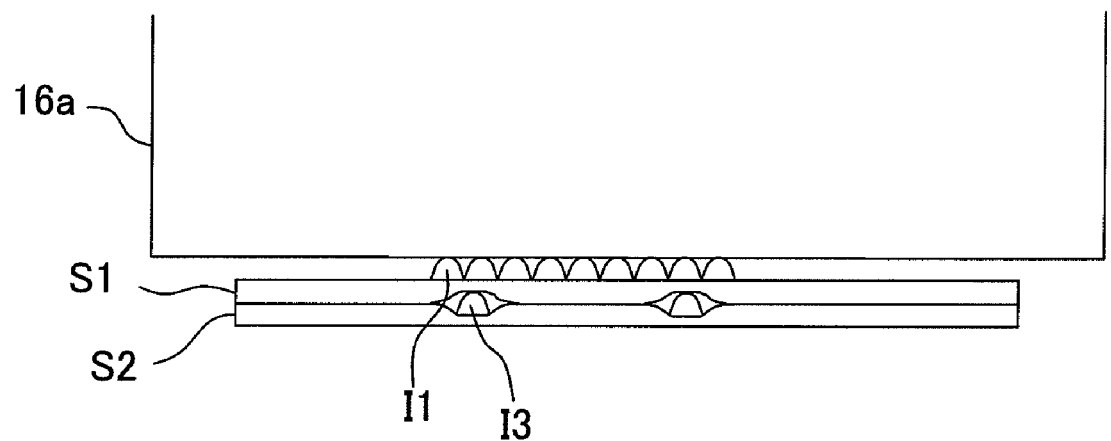
FIG. 12 shows the fourth modified embodiment corresponding to FIG. 5.

In this arrangement, as shown in FIG. 12, the ink droplets I3 are allowed to intervene between the sheet S1 and the sheet S2 at the portions of the upper surface of the sheet S2 on which the ink droplets I3 are landed, wherein the sheet S1 and the sheet S2 are not allowed to contact with each other directly. Therefore, when the ink droplets I1 are landed on the portions of the upper surface of the sheet S1 opposed to the ink droplets I3, and when the ultrasonic vibration is applied to the portions of the sheets S1, S2 opposed to the ink droplets I1 in the same manner as in the embodiment described above, the sheet S1 and the sheet S2 are not welded at the portions.

Accordingly, when the ink droplets I3 are previously landed on the parts of the portions of the upper surface of the sheet S2 to be welded to the sheet S1, it is possible to partially weaken the welding strength between the sheet S1 and the sheet S2.

In the embodiment and the modified embodiments described above, the transport rollers 13a, 13b, which are provided to transport the sheets S1, S2, also serve as the stacking mechanism according to the present invention for stacking the sheet S1 and the sheet S2. However, a mechanism (stacking mechanism) for stacking the sheet S1 and the sheet S2 may be provided distinctly from the transport rollers 13a, 13b. Further, it is also allowable that the mechanism for stacking the sheet S1 and the sheet S2 is not provided in the ultrasonic welding apparatus. In this case, the sheet S1 and the sheet S2 may be previously bundled and stacked in a mutually contacting state before welding the sheet S1 and the sheet S2 in the ultrasonic welding apparatus.

In the embodiment of the present invention, each of the ink droplets I1 and I2 is formed of a single ink droplet, and the volume of each of the ink droplets to be discharged from the ink-jet head 14 are changed such that each of the ink droplets I1, which is landed on the upper surface of the sheet S1, has the height higher than the height of the ink droplets I2. On the contrary, when each droplet of the ink droplets I1 and I2 is formed of a plurality of the ink droplets discharged continuously, and when the ink droplets I1 and I2 are landed on the upper surface of the sheet S1, the number of the ink droplets to be continuously discharged for the ink droplets I2 may be decreased as compared with that of the ink droplets for the ink droplets I1. In other words, it is also allowable that the number of the ink droplets to be discharged from the ink-jet head 14 in order to form one droplet of the ink droplets I1 is different from that of the ink droplets to be discharged from the ink-jet head 14 in order to form one droplet of the ink droplets I2. That is, the head control section 33 may perform the control to determine the number of the ink droplets to be discharged from the ink-jet head 14 so that the height of the ink droplets I1 landed on the welding area A1 is lower than the height of the ink droplets I2 landed on the printing area A2.

Further, there is no limitation to the procedure in which only any one of the volume and the number of the ink droplets to be discharged from the ink-jet head 14 is changed between the case in which the ink droplets I1 are landed on the upper surface of the sheet S1 and the case in which the ink droplets I2 are landed. It is also allowable to change both of the volume and the number of the ink droplets to be discharged from the ink-jet head 14. That is, the head control section 33 may perform the control to determine both of the volume and the number of the ink droplets to be discharged from the ink-jet head 14 so that the height of the ink droplets I1 landed on the welding area A1 is higher than the height of the ink droplets I2 landed on the printing area A2.

In the embodiment of the present invention, the two sheets S1, S2 are welded to one another. However, three or more sheets (welding sheets), which are stacked in a mutually contacting state, can be also welded in the same manner as described above.

In the foregoing description, the photocurable ink droplets are discharged from the ink-jet head 14. However, it is also allowable to discharge other liquid droplets provided that the liquid droplets are curable, including, for example, liquid droplets melted by heating a resin which is solidified at the normal temperature.

In the foregoing description, the sheets S1, S2, which are to be welded to one another, are composed of the PP resin. However, the materials of the sheets S1, S2 may be materials other then the PP resin, provided that the materials can be melted by applying the ultrasonic vibration.

In the foregoing description, the sheets S1, S2 are exemplified as the members to be welded to one another by way of example. However, the present invention is not limited to the ultrasonic welding apparatus for welding the plurality of sheet-shaped members to one another. The ultrasonic welding apparatus according to the present invention is usable for any stack of a plurality of members formed of materials capable of being welded by applying the ultrasonic vibration, provided that the member, in the stack, which is stacked on the side of the welding horn, has a sufficiently thin thickness to an extent as explained below. In this context, it is desirable that the thickness of the member stacked on the side of the welding horn (hereinafter simply referred to as "horn side member") is thin to such an extent that the pressure is transmitted to only the area, of the rear surface thereof not facing the welding horn, overlapped with the solidified ink droplets, when the horn side member is pressed by the welding horn. In other words, when the welding horn is pressed to make the abutment against the horn side member by the aid of the solidified ink droplets, if the thickness of the horn side member is sufficiently thin, then the pressure is transmitted to the area, of the rear surface of the horn side member, overlapped with the solidified ink droplets, but the pressure is not transmitted to the other areas of the rear surface of the horn side member. Therefore, when the ultrasonic vibration is applied to the welding horn, the horn side member and other member stacked on the rear surface of the horn side member are welded to one another in only the area overlapped with the ink droplets. In this way, for example, a stack, which is obtained by stacking a thin sheet-shaped member composed of PP resin (a second member) on another member having a predetermined shape composed of PP resin formed by the injection molding (a first member), can be welded to one another in the same manner as explained above.

What is claimed is:

1. An ultrasonic welding apparatus which welds a first member and a second member of a welding-objective member, the first and second members being stacked to be brought into contact with each other, the ultrasonic welding apparatus comprising:
 a first liquid droplet discharge head which discharges a curable liquid droplet toward a surface of the welding-objective member; and
 an ultrasonic vibration-applying mechanism which includes a contact member which is brought into contact with the liquid droplets cured on the surface of the welding-objective member and a vibrator which vibrates the contact member and which applies an ultrasonic vibration to the welding-objective member via the cured liquid droplets.

2. The ultrasonic welding apparatus according to claim 1, wherein both of the first and second members are sheet members.

3. The ultrasonic welding apparatus according to claim 2, further comprising a stacking mechanism which bundles and stacks the sheet members to be brought into contact with each other to form the welding-objective member.

4. The ultrasonic welding apparatus according to claim 3, further comprising a transport mechanism which includes a pair of transport rollers which interpose the welding-objective member therebetween and which transport the interposed welding-objective member to a droplet-landing position at which the liquid droplets discharged from the first liquid droplet discharge head are capable of being landed, wherein the transport rollers serve also as the stacking mechanism.

5. The ultrasonic welding apparatus according to claim 3, further comprising a second liquid droplet discharge head which discharges a curable liquid droplet onto a surface, of one of the sheet members, which is to be welded to the other sheet member, among the sheet members of the welding-objective member.

6. The ultrasonic welding apparatus according to claim 2, wherein the welding-objective member further includes a surface-forming sheet which is formed of a material different from materials forming the sheet members and which is stacked on the stacked sheet members such that a surface layer of the surface-forming sheet is the surface of the welding-objective member; and
 the first liquid droplet discharge head discharges the liquid droplets onto the surface-forming sheet.

7. The ultrasonic welding apparatus according to claim 6, wherein the material for forming the surface-forming sheet has a melting point which is higher than those of the materials for forming the sheet members.

8. The ultrasonic welding apparatus according to claim 6, further comprising an exfoliating mechanism which exfoliates the surface-forming sheet from the welding-objective member including the sheet members having been welded by the ultrasonic vibration applied to the welding-objective member by the ultrasonic vibration-applying mechanism.

9. The ultrasonic welding apparatus according to claim 2, wherein the welding-objective member further includes a soluble surface layer which is soluble in a predetermined solvent and which is stacked on the sheet members such that a surface layer of the soluble surface layer is the surface of the welding-objective member.

10. The ultrasonic welding apparatus according to claim 9, further comprising a soluble layer-removing mechanism which removes the soluble surface layer by treating the welding-objective member, in which the sheet members and the soluble surface layer are welded to one another, with the predetermined solvent, while allowing the sheet members to remain.

11. The ultrasonic welding apparatus according to claim 2, further comprising a controller which controls the first liquid droplet discharge head and the ultrasonic vibration-applying mechanism.

12. The ultrasonic welding apparatus according to claim 11, wherein the controller controls the first liquid droplet discharge head based on welding strength information about a welding strength of the sheet members such that spacing distances between the liquid droplets landed on the surface of the welding-objective member are greater as a welding with a weaker strength is designated by the welding strength information.

13. The ultrasonic welding apparatus according to claim 11, wherein the controller controls the first liquid droplet discharge head based on welding position data for designating a position at which the sheet members are to be welded on the surface of the welding-objective member, and image data for forming an image without welding the sheet members on the surface such that when the liquid droplets are discharged from the first liquid droplet discharge head in accordance with the image data, at least one of a volume and a number of the liquid droplets to be discharged is determined so that height of the liquid droplets, cured on the surface of the welding-objective member, are lower than height of the liquid droplets when the liquid droplets are discharged from the first liquid droplet discharge head in accordance with the welding position data.

14. The ultrasonic welding apparatus according to claim 2, wherein the first liquid droplet discharge head discharges photocurable liquid droplets; and
 the ultrasonic welding apparatus further comprises a light-radiating mechanism which radiates a light onto the photocurable liquid droplets discharged from the first liquid droplet discharge head and adhered to the surface of the welding-objective member.

15. A method for producing a welded product in which first and second members are welded to each other, the method comprising:
 providing a welding workpiece including the first and second members stacked to be brought into contact with each other;
 discharging curable liquid droplets toward a surface of the welding workpiece; and
 welding the first and second members by bringing a contact member into contact with the liquid droplets cured on the surface of the welding workpiece and vibrating the contact member to apply ultrasonic vibration to the welding workpiece via the cured liquid droplets.

16. The method for producing the welded product according to claim 15, wherein both of the first and second members are sheet members.

17. The method for producing the welded product according to claim 16, wherein a surface-forming sheet, which is formed of a material different from those forming the sheet members, is stacked so that the surface-forming sheet is an uppermost layer of the welding workpiece when the welding workpiece is provided; and
 the curable liquid droplets are discharged onto a surface of the surface-forming sheet as the surface of the welding workpiece.

18. The method for producing the welded product according to claim 17, wherein the material for forming the surface-forming sheet has a melting point which is higher than those of the materials forming the sheet members.

* * * * *